United States Patent

Kurematsu et al.

Patent Number: 5,251,050
Date of Patent: Oct. 5, 1993

[54] LIQUID CRYSTAL DISPLAY HAVING SPONTANEOUS POLARIZATION ABOVE THRESHOLD VOLTAGE TIMES LIQUID CRYSTAL AND SUB-CAPACITOR CAPACITANCE OVER TWO TIMES PIXEL AREA

[75] Inventors: Katsumi Kurematsu, Kawasaki; Shuzo Kaneko, Yokohama, both of Japan

[73] Assignee: Canon Kabushiki Kaisha, Tokyo, Japan

[21] Appl. No.: 916,629

[22] Filed: Jul. 22, 1992

[30] Foreign Application Priority Data

Jul. 25, 1991 [JP] Japan ................. 3-207272

[51] Int. Cl.$^5$ .................. G02F 1/1343; G02F 1/13
[52] U.S. Cl. ...................... 359/57; 359/56; 359/59; 359/100
[58] Field of Search .............. 359/56, 57, 59, 100

[56] References Cited

U.S. PATENT DOCUMENTS

| | | | |
|---|---|---|---|
| 4,582,395 | 4/1986 | Morozumi | 359/57 |
| 4,666,253 | 5/1987 | Yoshida | 350/334 |
| 4,671,642 | 6/1987 | Ohkubo et al. | 355/3 R |
| 4,681,404 | 7/1987 | Okada et al. | 359/100 |
| 4,728,175 | 3/1988 | Baron | 359/60 |
| 4,738,515 | 4/1988 | Okada et al. | 359/56 |
| 4,789,223 | 12/1988 | Kasahara et al. | 359/57 |
| 4,824,217 | 4/1989 | Chan et al. | 359/100 |
| 4,840,462 | 6/1989 | Hartmann | 350/350 S |
| 4,955,697 | 9/1990 | Tsukada et al. | 359/57 |
| 4,961,630 | 10/1990 | Baron et al. | 359/54 |
| 5,113,273 | 5/1992 | Mochizuki et al. | 359/56 |
| 5,126,867 | 6/1992 | Ishiwata | 359/100 |
| 5,151,805 | 9/1992 | Takeda et al. | 359/57 |

FOREIGN PATENT DOCUMENTS

| | | | |
|---|---|---|---|
| 0284134 | 9/1988 | European Pat. Off. | |
| 62-32424 | 2/1987 | Japan | 359/56 |
| 63-249897 | 10/1988 | Japan | |
| 64-10214 | 1/1989 | Japan | 359/100 |

Primary Examiner—William L. Sikes
Assistant Examiner—Anita P. Gross
Attorney, Agent, or Firm—Fitzpatrick, Cella, Harper & Scinto

[57] ABSTRACT

A liquid crystal display apparatus has a matrix of ferroelectric liquid crystal pixels which perform gradation display under active matrix driving. Each pixel is provided with a sub-capacitance for eliminating the influence of noise introduced through parasitic capacitance of a driving thin film transistor. The ferroelectric liquid crystal has a spontaneous polarization value $P_S$ [C/cm$^2$] expressed by the following formula:

$$P_S > V_{th}(C_{LC}+C_S)/2A,$$

where $C_{LC}$ represents the capacitance [F] of the pixel serving as a capacitor, $C_S$ represents the capacitance [F] of the sub-capacitance, A represents the area [cm$^2$] of the pixel, and $V_{th}$ represents the inversion threshold voltage of the liquid crystal.

11 Claims, 4 Drawing Sheets

LIQUID CRYSTAL DISPLAY HAVING SPONTANEOUS POLARIZATION ABOVE THRESHOLD VOLTAGE TIMES LIQUID CRYSTAL AND SUB-CAPACITOR CAPACITANCE OVER TWO TIMES PIXEL AREA

BACKGROUND OF THE INVENTION

1. Field of the Invention

The present invention relates to a display apparatus using a liquid crystal, particularly a ferroelectric liquid crystal, which can be driven by an active matrix driving method to perform gradation display, i.e., the display of a natural dynamic picture.

2. Description of the Related Art

A ferroelectric liquid crystal display apparatus capable of performing gradation display is disclosed in Japanese Patent Laid-Open No. 63-249897 corresponding to U.S. Pat. No. 4,840,462 and EP 284,134.

Briefly, the operation of this type of display apparatus is as follows. As the first step, each pixel of the matrix is reset to a first stable state. Then, an electrostatic charge Q is imparted to the pixel electrode through an active element so as to cause a switching of the ferroelectric liquid crystal into a second stable state in a local portion of each pixel. According to this operation principle, representing the area of the local portion switched to the second stable state by a and the magnitude of spontaneous polarization of the ferroelectric liquid crystal by $P_S$, charges of an amount expressed by $2P_S \cdot a$ are moved and this movement, i.e., the switching to the second stable state, continues until the charge amount $2P_S \cdot a$ grows to a level large enough to cancel the initially given charge Q. Finally, a portion of each pixel having the area a represented by the following formula (1) is switched to the second stable state.

$$a = Q/2P_S \quad (1)$$

It is therefore possible to control the area a by varying the charge amount Q, thus attaining an area gradation.

In general, this type of display apparatus is used in such a manner that the optical axis in the first stable state is aligned with one of the axes under a cross-nicol polarizer so that the first and second stable states respectively provide a black display and a white display.

In the known ferroelectric liquid crystal display apparatus of the type described, the gradation display (area gradation control) is performed by controlling the inversion domain area by canceling, by the inversion of spontaneous polarization of the ferroelectric liquid crystal, the charge which has been accumulated in each liquid crystal pixel which is regarded as being a capacitor. In this type of display apparatus, therefore, it is essential that each pixel not have any sub-capacitance.

This requirement, however, is not actually met. Referring to FIG. 5, a TFT (Thin Film Transistor) is used as the active switching element. Such element has parasitic capacitances $C_{gd}$ between the gate and the drain and $C_{sd}$ between the source and the drain. Consequently, noises are introduced into the pixel electrode through these parasitic capacitances. FIG. 6 shows, by way of example, the influence on the pixel electrode voltage (voltage applied to liquid crystal layer) $V_{LC}$ caused by gate pulse noise which is introduced through the parasitic capacitance $C_{gd}$, on the assumption that there is no sub-capacitance. It will be seen that the pixel electrode voltage is reduced by $\Delta V_1$ immediately after application of a reset voltage $V_R$, by the influence of falling noise of the gate pulse. Similarly, the pixel electrode voltage is lowered by $\Delta V_2$ immediately after the application of the writing voltage $V_W$. These phenomena are generally referred to as "oscillation by parasitic capacitance" and the degree of influence of such phenomena is determined by the ratio between the parasitic capacitance and the capacitance of $C_{LC}$ of the liquid crystal. The degree of influence also becomes greater as the density of the pixels is increased. The oscillation by parasitic capacitance, therefore, adversely affects the display and, in the worst case, makes it impossible to effect the desired display.

It has generally been known to provide a sub-capacitance $C_S$ in parallel with the liquid crystal pixel capacitance $C_{LC}$ as shown in FIG. 2, in order to reduce the oscillation by parasitic capacitance in liquid crystal devices which operate in an on-off mode, the capacitance of such sub-capacitance being 5 to 10 times as large that of the capacitance $C_{LC}$ of the liquid crystal. Provision of the parallel sub-capacitance $C_S$ in the manner shown in FIG. 2 poses the following problems. When the cancellation of the charge in the liquid crystal capacitance $C_{LC}$ by the inversion of ferroelectric liquid crystal is commenced during driving of such ferroelectric liquid crystal, charges are supplied from the parallel sub-capacitor $C_S$ to the liquid crystal capacitance $C_{LC}$. Such charges form a current i. As a consequence, the γ-characteristic (voltage/transmissivity characteristic) of the ferroelectric liquid crystal is changed to have a very steep gradient as shown by the broken line in FIG. 4. Consequently, the inversion domain spreads beyond the expected area of inversion, thus hampering the gradation control. The broken-line curve in FIG. 4 shows the γ-characteristic of the ferroelectric liquid crystal as obtained when an auxiliary parasitic capacitance $C_S$, having a capacitance 5 times as large that of the pixel capacitance $C_{LC}$, is connected to a conventional ferroelectric liquid crystal in parallel therewith.

SUMMARY OF THE INVENTION

Accordingly, an object of the present invention is to provide a liquid crystal display apparatus which can operate with an exquisite gradation characteristic without being substantially influenced by oscillation caused by parasitic capacitance, thereby overcoming the above-described problem of the prior art.

To this end, according to the present invention, there is provided a liquid crystal display apparatus having a matrix of liquid crystal pixels containing a liquid crystal which perform display under active matrix driving, characterized in that each of the pixels is provided with a sub-capacitance and that the liquid crystal has a spontaneous polarization value $P_S$ [C/cm$^2$] expressed by the following formula:

$$P_S > V_{th}(C_{LC} + C_S)/2A,$$

where $C_{LC}$ represents the capacitance [F] of the pixel serving as a capacitor, $C_S$ represents the capacitance [F] of the sub-capacitance, A represents the area [cm$^2$] of each pixel, and $V_{th}$ represents the inversion threshold voltage of the liquid crystal.

The liquid crystal used in the display apparatus of the present invention, typically a ferroelectric liquid crystal, has a spontaneous polarization value $P_S$ which is determined to avoid any degradation in the γ-characteristic of gradation when a sub-capacitance is used for the purpose of eliminating any oscillation by parasitic capacitance. It is therefore possible to prevent oscillation without impairing γ-characteristic of the gradation display.

DESCRIPTION OF THE PREFERRED EMBODIMENTS

Figure 1:
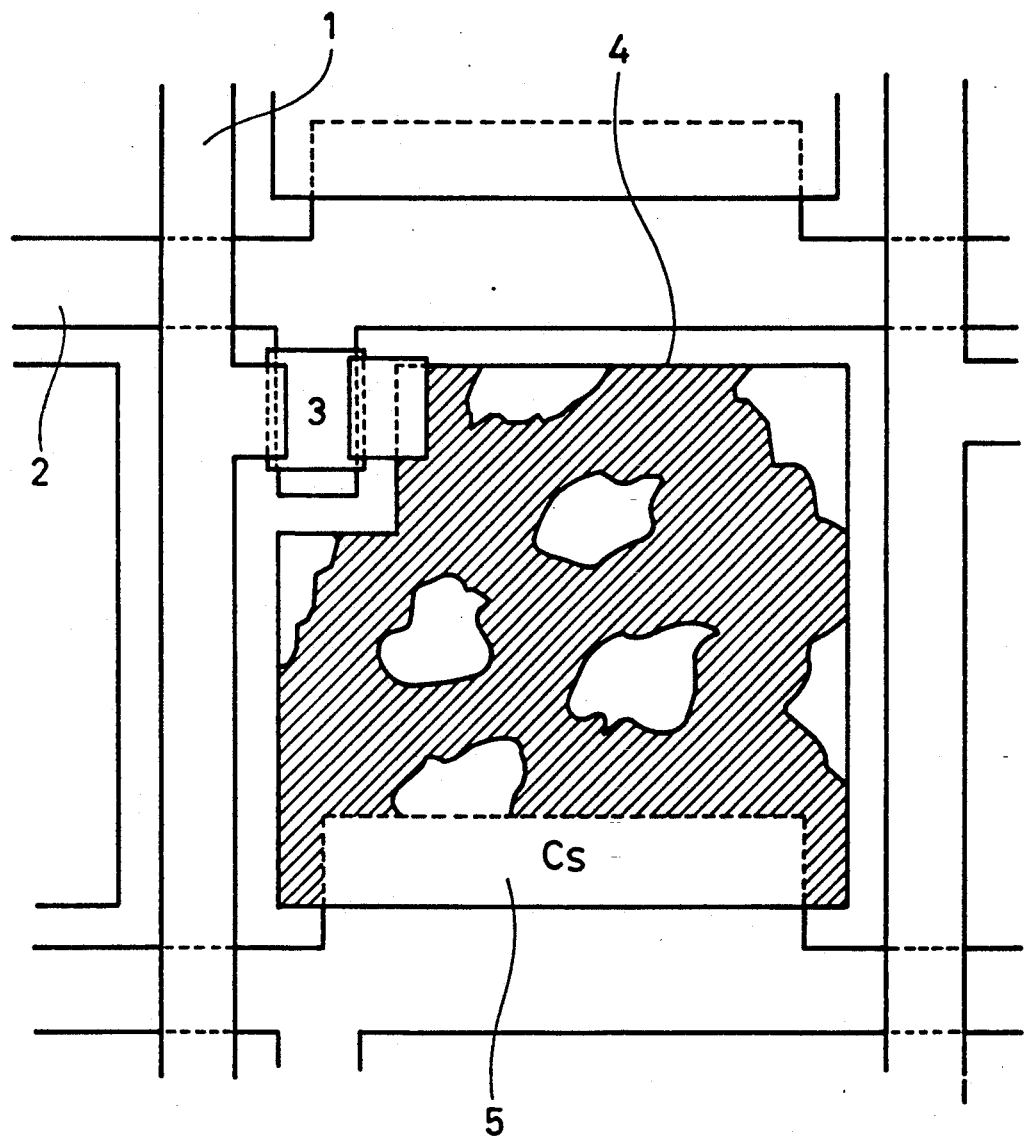
FIG. 1 is an enlarged view of a pixel used in an embodiment of the ferroelectric liquid crystal display apparatus of the present invention, having a sub-capacitance.

FIG. 1 is an enlarged plan view of a pixel incorporated in an embodiment of the display apparatus of the present invention. Numeral 1 denotes a signal line, while numeral 3 denotes a gate line. A ferroelectric liquid crystal pixel is denoted by 4. A thin film transistor used as an active driving element is designated at 3, while a sub-capacitor portion having a capacitance $C_S$ is denoted by 5. A ferroelectric liquid crystal layer having a thickness of, for example, 1.3 μ, is sandwiched between a pair of substrates, a substrate carrying the thin film transistor 3 and a substrate carrying opposing electrode, each substrate carrying as required a laminate of a passivation film and an aligning layer, thus realizing the so-called SSFLC (Surface Stabilized Ferroelectric Liquid Crystal).

Figure 2:
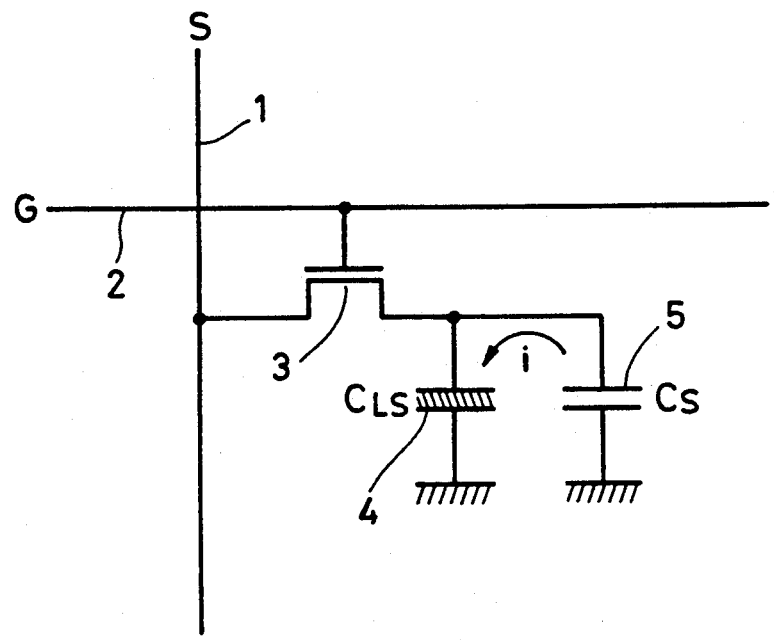
FIG. 2 is a circuit diagram showing a circuit equivalent to an active matrix pixel with sub-capacitance.

In an example, the pixel ha an area A which is, for example $1.0 \times 10^{-4}$ cm², in a square each side of which is 100 μ long. The liquid crystal pixel as a capacitor has a capacitance $C_{LC}$ of 0.2 PF, while the sub-capacitor portion has a capacitance $C_S$ of 1.0 PF which is five times as large that of the pixel capacitance $C_{LC}$. A ferroelectric liquid crystal made from a blend material having a spontaneous polarization value $P_S$ of 25 nC/cm² is used as the liquid crystal. A polyimide rubbing film was used as the aligning film. The pixel thus constructed forms a circuit which is equivalent to that shown in FIG. 2.

Figure 3:
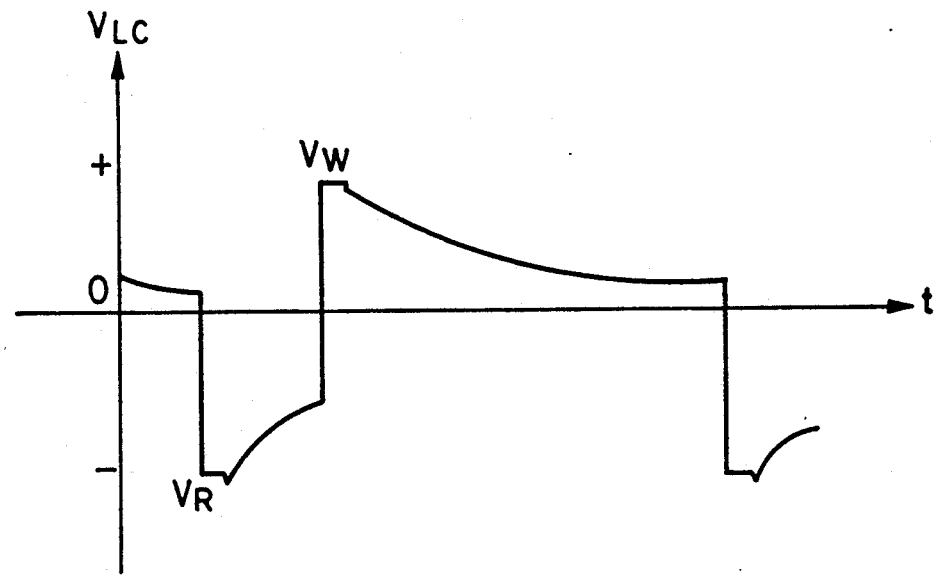
FIG. 3 is an illustration of a waveform of voltage applied to a pixel electrode in the ferroelectric liquid crystal display apparatus shown in FIG. 1.
Figure 4:
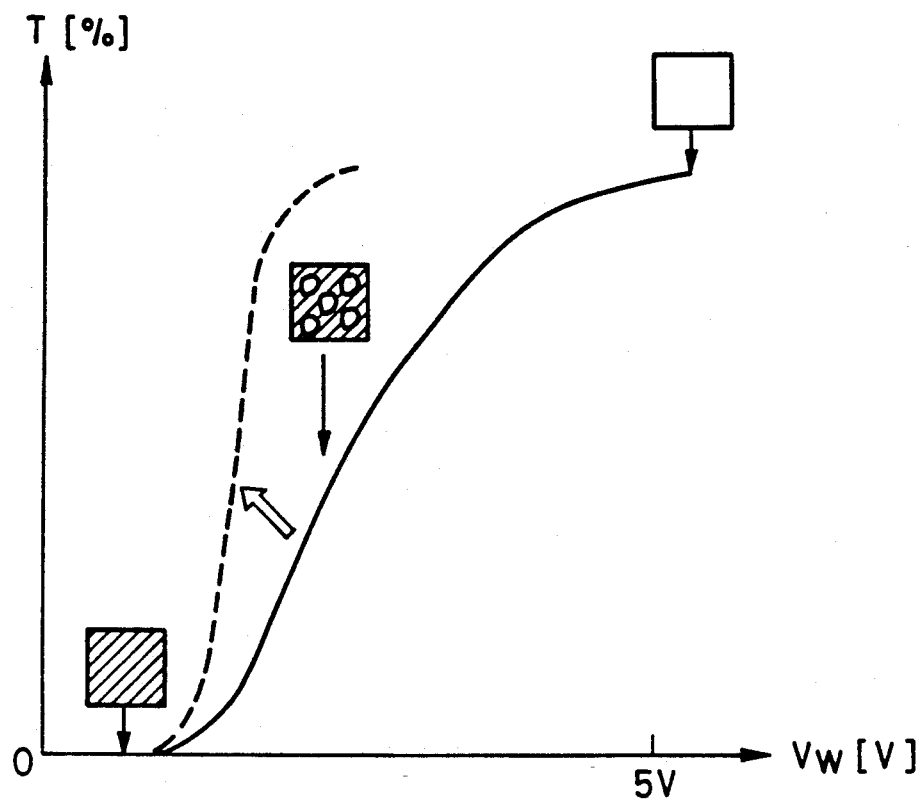
FIG. 4 is a graph showing the γ-characteristic of a ferroelectric liquid crystal used for gradation display.
Figure 5:
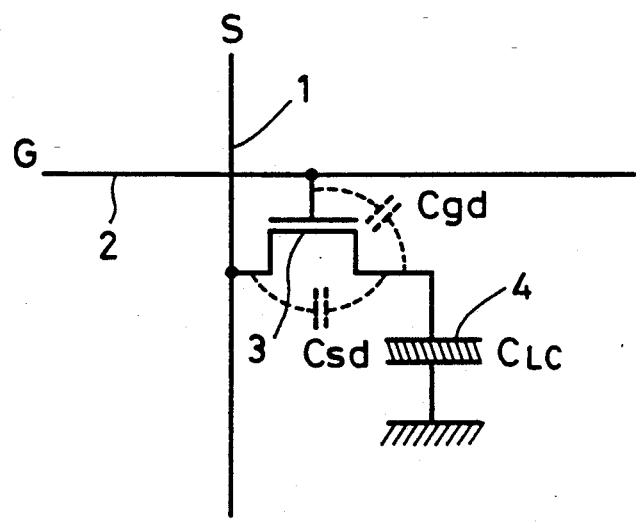
FIG. 5 is a circuit diagram showing a circuit equivalent to a pixel incorporated in a known ferroelectric liquid crystal gradation display apparatus.
Figure 6:
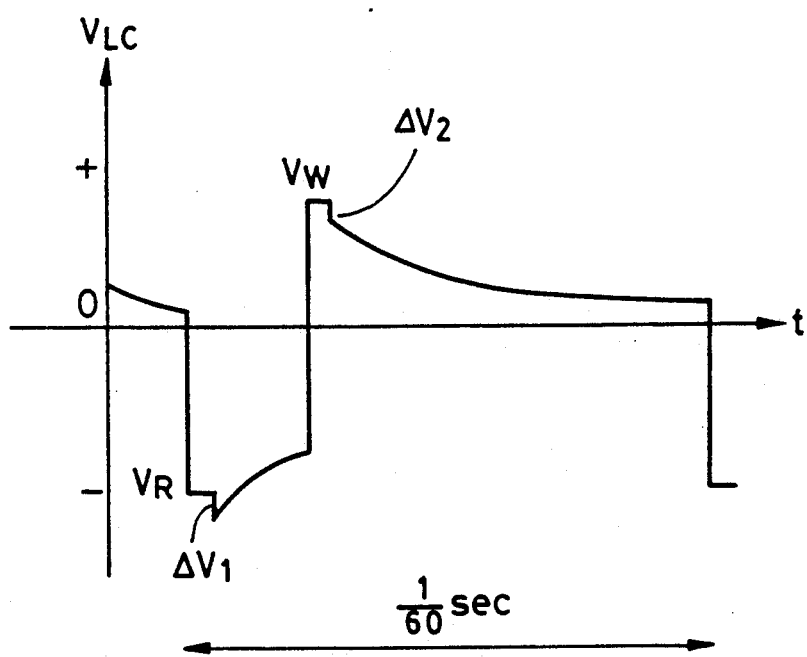
FIG. 6 is an illustration of waveform of voltage applied to a pixel electrode in the known ferroelectric liquid crystal gradation display apparatus.

The ferroelectric liquid crystal apparatus having the above-described construction was driven in an active manner by supplying reset and writing signals through the thin film transistor 3. In this embodiment, a voltage having the waveform shown in FIG. 3 was applied to the liquid crystal pixel. It will be seen that the voltage thereby applied to the pixel electrode was substantially free of oscillation caused by parasitic capacitance. In addition, an excellent gradation γ-characteristic, i.e., domain area gradation characteristic, was obtained as shown by the solid-line curve in FIG. 4.

It is to be noted that, in known ferroelectric liquid crystal display apparatus, the ferroelectric liquid crystal has a spontaneous polarization value $P_S$ of 1 to 5 nC/cm², whereas, in the apparatus of the present invention, the spontaneous polarization value $P_S$ is, for example, 25 nC/cm². This spontaneous polarization value is large enough to cancel also the charges supplied from the sub-capacitance $C_S$ to the liquid Crystal pixel capacitance $C_{LC}$, thus terminating any undesirable uncontrolled spread of the inverted domain.

More specifically, the voltage $V_A$ required for inverting the whole pixel area, i.e., the writing voltage in active driving, is represented by the following formula (2), as the aforementioned charge amount Q is represented by $= V_A (C_{LC} + C_S)$.

$$V_A = (2 P_S \cdot A)/(C_{LC} + C_S) \quad (2)$$
$$= (2 \times 25 \times 1.0 \times 10^{-4} [nC]/(0.2 + 1.0)[PF])$$
$$= 4.2 V$$

In addition, in the illustrated case, the inversion threshold voltage $V_{th}$ of the liquid crystal, defined as the point where the γ-characteristic curve starts to rise, is 1.0 V. It is therefore theoretically predicted that a characteristic will be obtained which starts to rise at 1.0 V and saturates at 4.2 V. This predicted characteristic well approximates the measured results shown in FIG. 4.

According to the invention, the $P_S$ value of the ferroelectric liquid crystal is determined so as to provide an appropriate or gentle γ-characteristic on the assumption that the sub-capacitor $C_S$ is provided on the pixel. From the formula (2) above, it is understood that the spontaneous polarization value $P_S$ should be greater than a value $V_{th}(C_{LC}+C_S)/2A$ at the smallest. Any spontaneous polarization value $P_S$ which would meet the condition of $P_S \leq V_{th}(C_{LC}+C_S)/2A$ may undesirably provide a display characteristic having no gradation, i.e., a step-like γ-characteristic, which causes the whole pixel area to be inverted at once when the writing voltage $V_W$ has exceeded the threshold voltage $V_{th}$. The gradient of the γ-characteristic curve decreases as the spontaneous polarization value $P_S$ increases, but the spontaneous polarization value $P_S$ is actually limited in ferroelectric liquid crystal materials which are now available. More practically, it is impossible to obtain a spontaneous polarization value exceeding 200 nC/cm² with the presently available ferroelectric liquid crystal materials. In other words, the spontaneous polarization value can be selected within the range between the value $V_{th}(C_{LC}+C_S)/2A$ and the above-mentioned practical upper limit value.

The liquid crystal display apparatus of the present invention can perform gradation display when applied with writing pulses after application of a reset voltage $V_R$ to each pixel, with the pulse width, voltage or number of the writing pulses controlled in accordance with the gradation information to be displayed. The apparatus of the present invention can be driven by a driving method which is detailed in U.S. Pat. No. 4,840,462 or EP 284,134.

As will be understood from the foregoing description, according to the present invention, it is possible to obtain an excellent and desired γ-characteristic of gradation display, while eliminating, by using a sub-capacitor, any oscillation caused by parasitic capacitance, by virtue of the use of a ferroelectric liquid crystal material having a spontaneous polarization value $P_S$ greater than $V_{th}(C_{LC}+C_S)/2A$.

What is claimed is:

1. A liquid crystal display apparatus having a matrix of liquid crystal pixels containing a liquid crystal which perform display under active matrix driving, characterized in that each of said pixels is provided with a sub-capacitance and that the liquid crystal has a spontaneous polarization value $P_S$ in $C/cm^2$ expressed by the following formula:

$$P_S > V_{th}(C_{LC}+C_S)/2A,$$

where $C_{LC}$ represents a capacitance in F of each said pixel serving as a capacitor, $C_S$ represents a capacitance in F of said sub-capacitance, A represents the area in $cm^2$ of each said pixel, and $V_{th}$ represents an inversion threshold voltage of said liquid crystal.

2. A liquid crystal display apparatus according to claim 1, wherein the liquid crystal is a ferroelectric liquid crystal.

3. A liquid crystal display apparatus having a matrix of liquid crystal pixels containing liquid crystal which perform gradation display under active matrix driving, characterized in that each of said pixels is provided with a sub-capacitance and that the liquid crystal has a spontaneous polarization value $P_S$ in $C/cm^2$ expressed by the following formula:

$$P_S > V_{th}(C_{LC}+C_S)/2A,$$

where $C_{LC}$ represents a capacitance in F of each said pixel serving as a capacitor, $C_S$ represents a capacitance in F of said sub-capacitance, A represents an area in $cm^2$ of each said pixel, and $V_{th}$ represents an inversion threshold voltage of said liquid crystal.

4. A liquid crystal display apparatus according to claim 3, wherein the liquid crystal is a ferroelectric liquid crystal.

5. A display apparatus comprising:
an active matrix cell having a matrix of pixels each having a sub-capacitor and including a liquid crystal having a spontaneous polarization value $P_S$ in $C/cm^2$ expressed by the following formula:

$$P_S > V_{th}(C_{LC}+C_S)/2A,$$

where $C_{LC}$ represents a capacitance in F of each said pixel serving as a capacitor, $C_S$ represents a capacitance in F of said sub-capacitor, A represents an area in $cm^2$ of said pixel, and $V_{th}$ represents an inversion threshold voltage of said liquid crystal; and voltage application means for applying to each said pixel a voltage signal high enough to reset each said pixel to an initial state followed by application of a writing voltage signal corresponding to information to be displayed.

6. A liquid crystal display apparatus according to claim 5, wherein said liquid crystal is a ferroelectric liquid crystal.

7. A display apparatus comprising:
an active matrix cell having a matrix of pixels each having a sub-capacitor and including a liquid crystal having a spontaneous polarization value $P_S$ in $C/cm^2$ expressed by the following formula:

$$P_S > V_{th}(C_{LC}+C_S)/2A,$$

where $C_{LC}$ represents a capacitance in F of each said pixel serving as a capacitor, $C_S$ represents a capacitance in F of said sub-capacitor, A represents an area in $cm^2$ of each said pixel, and $V_{th}$ represents an inversion threshold voltage of said liquid crystal; and voltage application means for applying to each said pixel a voltage signal high enough to reset each said pixel to an initial state followed by application of a gradation voltage signal corresponding to gradation information to be displayed.

8. A liquid crystal display apparatus according to claim 7, wherein said liquid crystal is a ferroelectric liquid crystal.

9. A display apparatus according to claim 7, wherein said gradation voltage signal is a voltage signal having a voltage value which varies in accordance with the gradation information.

10. A display apparatus according to claim 7, wherein said gradation voltage signal is a voltage signal having a voltage which varies in accordance with the gradation information.

11. A display apparatus according to claim 7, wherein said gradation voltage signal is a voltage pulse signal containing a number of pulses, said number varying in accordance with the gradation information.

* * * * *